(12) United States Patent
Hwang et al.

(10) Patent No.: US 10,488,911 B2
(45) Date of Patent: Nov. 26, 2019

(54) METHOD AND COMPUTING SYSTEM OF ALLOCATING REGISTERS

(71) Applicants: National Taiwan University, Taipei (TW); MEDIATEK INC., Hsin-Chu (TW)

(72) Inventors: Yuan-Shin Hwang, New Taipei (TW); Jenq-Kuen Lee, Hsinchu (TW); Shao-CHung Wang, Taichung (TW); Li-Chen Kan, Hsinchu County (TW)

(73) Assignees: National Taiwan University, Taipei (TW); MEDIATEK INC., Hsin-Chu (TW)

( * ) Notice: Subject to any disclaimer, the term of this patent is extended or adjusted under 35 U.S.C. 154(b) by 389 days.

(21) Appl. No.: 15/339,954

(22) Filed: Nov. 1, 2016

(65) Prior Publication Data
US 2018/0120919 A1    May 3, 2018

(51) Int. Cl.
G06F 9/44      (2018.01)
*G06F 1/3234*  (2019.01)
G06F 9/30      (2018.01)

(52) U.S. Cl.
CPC ........ *G06F 1/3234* (2013.01); *G06F 9/30101* (2013.01)

(58) Field of Classification Search
CPC .............. G06F 1/3234; G06F 9/30101; G06F 9/30105; G06F 9/30112
See application file for complete search history.

(56) References Cited

U.S. PATENT DOCUMENTS

| | | | | |
|---|---|---|---|---|
| 9,606,843 B2* | 3/2017 | Anderson | ............. | G06F 9/5094 |
| 10,073,513 B2* | 9/2018 | Rash | ............. | G06F 1/26 |
| 10,409,767 B2* | 9/2019 | Henry | ............. | G06F 9/30032 |
| 2005/0132171 A1* | 6/2005 | Bharadwaj | ............. | G06F 8/441 712/217 |
| 2011/0239013 A1* | 9/2011 | Muller | ............. | G06F 1/3221 713/320 |
| 2012/0254847 A1* | 10/2012 | George | ............. | G06F 8/441 717/156 |
| 2013/0086598 A1* | 4/2013 | Gschwind | ............. | G06F 9/3832 719/330 |
| 2013/0326252 A1* | 12/2013 | Ise | ............. | G06F 1/3234 713/323 |
| 2014/0115357 A1* | 4/2014 | Li | ............. | G06F 1/3234 713/320 |
| 2015/0026433 A1* | 1/2015 | Ishizaki | ............. | G06F 9/3012 712/29 |
| 2015/0143061 A1* | 5/2015 | Khailany | ............. | G06F 9/38 711/154 |
| 2015/0153919 A1* | 6/2015 | Matejka | ............. | G06F 16/93 715/720 |
| 2015/0193234 A1* | 7/2015 | Udayakumaran | ............. | G06F 9/3013 712/3 |

(Continued)

OTHER PUBLICATIONS

Tiantian Liu, Register Allocation for Simultaneous Reduction of Energy and Peak Temperature on Registers, pp. 1-6., https://ieeexplore.ieee.org/stamp/stamp.jsp?tp=&arnumber=5763010 (Year: 2011).*

(Continued)

*Primary Examiner* — Mongbao Nguyen
(74) *Attorney, Agent, or Firm* — Winston Hsu

(57) ABSTRACT

A method of allocating registers, includes for each of a plurality of live ranges of variables, calculating an energy saving value of each of the plurality of live ranges of the variables; classifying the plurality of live ranges of the variables into a plurality of queues according to the energy saving values of the plurality of live ranges of the variables; and assigning the plurality of live ranges of the variables in the plurality of queues into a plurality of registers.

12 Claims, 6 Drawing Sheets

(56) References Cited

U.S. PATENT DOCUMENTS

| | | | | |
|---|---|---|---|---|
| 2015/0278106 A1* | 10/2015 | Gschwind | ............... | G06F 12/10 |
| | | | | 711/202 |
| 2015/0301572 A1* | 10/2015 | Zhou | .................... | G06F 1/3203 |
| | | | | 713/320 |
| 2015/0301864 A1* | 10/2015 | Tseng | ................... | G06F 9/5011 |
| | | | | 718/104 |
| 2018/0004269 A1* | 1/2018 | Rosenzweig | ........... | G06F 1/324 |

OTHER PUBLICATIONS

Yi-Ping You, Vector-Aware Register Allocation for GPU Shader Processors, 2015, pp. 99-108. https://dl.acm.org/citation.cfm?id=2830703 (Year: 2015).*

Xiaotong Zhuang, Hardware-managed Register Allocation for Embedded Processors, 2004, pp. 1-10. http://citeseerx.ist.psu.edu/viewdoc/download?doi=10.1.1.83.5457&rep=rep1&type=pdf (Year: 2004).*

Matthias Braun, Register Spilling and Live-Range Splitting for SSA-Form Programs, 2009, pp. 2009 https://pp.ipd.kit.edu/uploads/publikationen/braun09cc.pdf (Year: 2009).*

Pushtikant Malviya, An Effective Approach for Allocating VMs to Reduce the Power Consumption of Virtualized Cloud Environment, 2014, pp. 1-5. https://ieeexplore.ieee.org/stamp/stamp.jsp?tp=&arnumber=6821462 (Year: 2014).*

Sparsh Mittal, A Survey of Techniques for Architecting and Managing GPU Register File, 2016, pp. 1-13. https://ieeexplore.ieee.org/stamp/stamp.jsp?tp=&arnumber=7448930 (Year: 2016).*

* cited by examiner

METHOD AND COMPUTING SYSTEM OF ALLOCATING REGISTERS

BACKGROUND OF THE INVENTION

1. Field of the Invention

The present invention relates to a method and computing system of allocating registers, and more particularly, to a method and a computing system of allocating registers to reduce the energy consumption.

2. Description of the Prior Art

With the development of the technology, the increasing demand for computing power of hardware has led to the large energy consumption. For example, the more hardware threads graphics processing unit (GPU) supports, the more performance and power consumptions we obtain. Different register organization methods of hardware are proposed to reduce the power consumption of the hardware. For example, a hierarchical register file organization and an affine register file organization of GPU can be used in the design of processor.

Moreover, modern GPUs are designed as single instruction multiple data (SIMD) execution model that groups the parallel threads to execute the same instruction in the lock-step. In order to rapidly switch to different tasks, each thread has its own register to store the context. However, the large number of threads and registers has also led to the high energy consumption problem of GPU.

Therefore, how to reduce the power consumption of allocating large amount of registers has become a crucial issue.

SUMMARY OF THE INVENTION

It is therefore an object of the present invention to provide a method and computing system of allocating registers and to reduce the energy consumption so as to improve the disadvantages of the prior art.

An embodiment of the present invention discloses a method of allocating registers, comprising for each of a plurality of live ranges of variables, calculating an energy saving value of each of the plurality of live ranges of the variables; classifying the plurality of live ranges of the variables into a plurality of queues according to the energy saving values of the plurality of live ranges of the variables; and assigning the plurality of live ranges of the variables in the plurality of queues into a plurality of registers.

An embodiment of the present invention further discloses a computer system of allocating registers for hardware, comprising a processing device for allocating registers; and a memory device coupled to the processing device, for storing a program code instructing the processing device to perform a process, wherein the process comprises, for each of a plurality of live ranges of variables, calculating an energy saving value of each of the plurality of live ranges of the variables; classifying the plurality of live ranges of the variables into a plurality of queues according to the energy saving values of the plurality of live ranges of the variables; and assigning the plurality of live ranges of the variables in the plurality of queues into a plurality of registers.

These and other objectives of the present invention will no doubt become obvious to those of ordinary skill in the art after reading the following detailed description of the preferred embodiment that is illustrated in the various figures and drawings.

DETAILED DESCRIPTION

Register allocation is a process of assigning a large number of variables into a small number of registers. Not all variables are in use, which is also called live, at the same time, so some registers may be assigned to more than one variable. However, two variables in use at the same time cannot be assigned to the same register without corrupting. Besides, in order to reduce the power consumption, the registers of hardware are reorganized. Different from the prior art of designing with performance consideration, a register allocation method that is dedicated to allocating the registers by a compiler with high energy saving is adopted in embodiments of the present invention.

Figure 1:
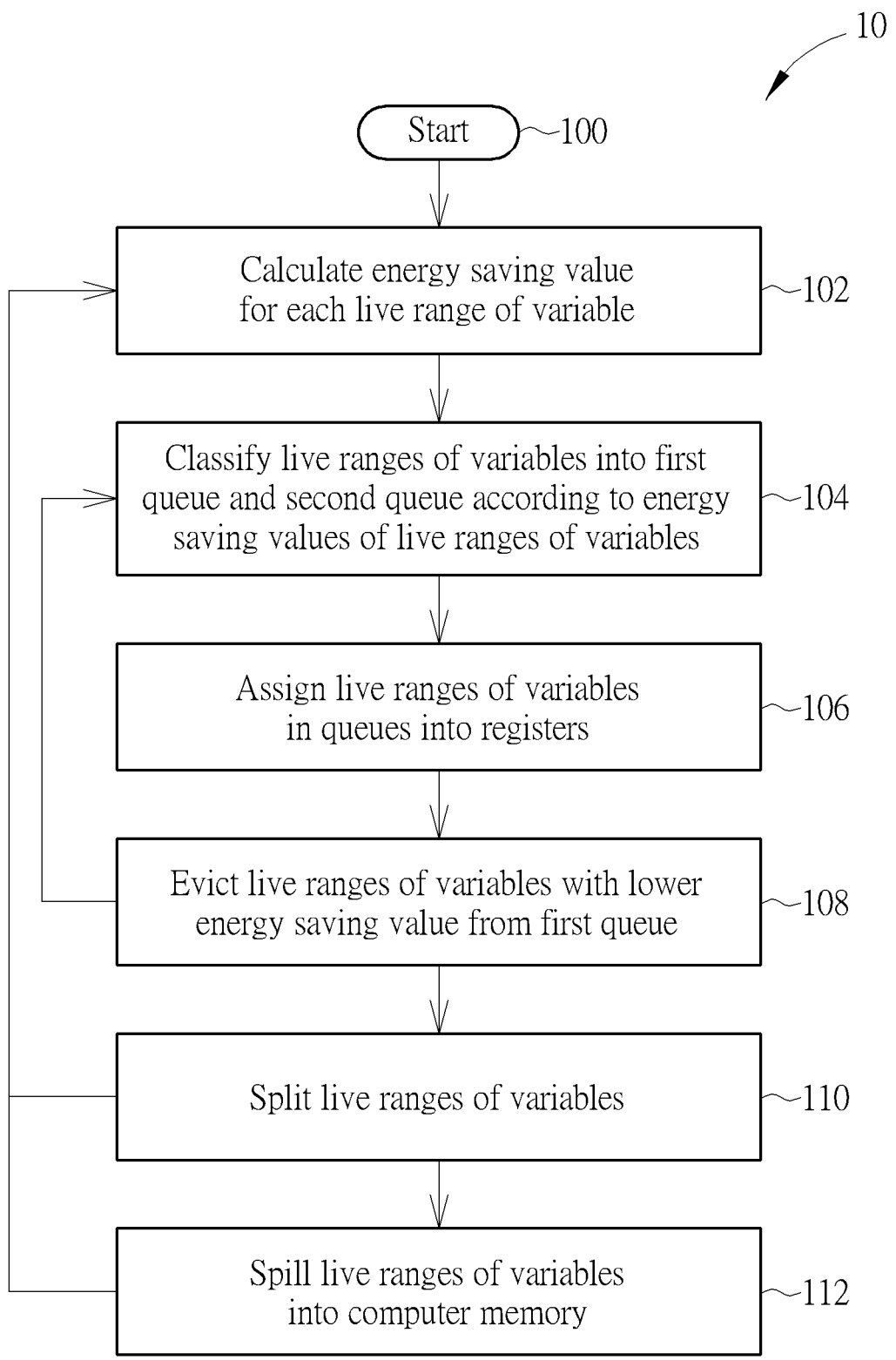
FIG. 1 is a schematic diagram of a register allocation process according to an embodiment of the present invention.

Please refer to FIG. 1 for detailed descriptions. FIG. 1 is a schematic diagram of a register allocation process 10 according to an embodiment of the present invention. The register allocation process 10 can be compiled into a program code to be saved in a memory device, and performed by a processor or a processing device. The register allocation process 10 includes the following steps:

Step 100: Start.

Step 102: Calculate energy saving value for each live range of variable.

Step 104: Classify live ranges of variables into first queue and second queue according to energy saving values of live ranges of variables.

Step 106: Assign live ranges of variables in queues into registers.

Step 108: Evict live ranges of variables with lower energy saving value from first queue.

Step 110: Split live ranges of variables.

Step 112: Spill live ranges of variables into computer memory.

According to the register allocation process 10, in Step 102, live ranges can be calculated for all variables. The live range may be associated with the time interval when a corresponding variable is live or active. The live range of a variable may be a set of program points at which the variable is live. For each of the live ranges of variables, an energy saving value of each live range can be calculated. For example, a compiler calculates the energy saving value for the live range of the variable by using a cost model of hardware. The energy saving value of each live range may be calculated when the live range is allocated to a low access energy register. For example, the energy saving value may be a difference value between an energy consumption value of the live range of the variable being allocated to a first register and an energy consumption value of the live range of the variable being allocated to a second register. For example, the energy saving value may be a difference value between an energy consumption value of the live range of the variable being allocated to a low access energy register and an energy consumption value of the live range of the variable being allocated to a general register.

Further, the energy saving value of each live range of variable may be calculated according to at least one of the following: (a) read/write access energy associated with the register (abbreviated to "A"), which is an energy consumption when the variable is read/written from/into the register, (B) read/write access count (abbreviated to "B") associated with the register, which is the count when the variable is read/written from/into the register during the live range, and (C) a length of the live range of the variable (abbreviated to "C"), which is the length of all time intervals when the variable is live. For example, energy consumptions may be calculated by the compiler according to the following equation:

$$E_i = \frac{(A_i \times B_i)}{C_i} \quad (1)$$

where $E_i$ represents a respective energy consumption corresponding to the live range of the variable being allocated to i-th register; $A_i$ represents read/write access energy corresponding to the live range of the variable being allocated to i-th register; $B_i$ represents read/write access count corresponding to the live range of the variable being allocated to i-th register; $C_i$ represents length of the live range of the variable.

For example, an energy consumption $E_1$ of a variable being allocated to a first register (e.g., a low access energy register) can be calculated by using equation (1). An energy consumption $E_2$ of a variable being allocated to a second register (e.g., a general register) is calculated by using equation (1). The difference value between the energy consumption $E_1$ and the energy consumption $E_2$ may represent the energy saving value of the live range of the variable. Notably, the energy saving value might be positive or negative. When the energy saving value is negative, the live range of the variable saves energy when the variable is live. When the energy saving value is positive, the live range of the variable does not save energy when the variable is live.

After calculating the energy saving value of each of the live ranges of the variables, in Step 104, the compiler classifies the live ranges of the variables into a plurality of queues according to the energy saving values of the live ranges of the variables. For example, the compiler classifies the live ranges of the variables into two queues (e.g., an EQueue and a SQueue) according to the energy saving values of the live ranges of the variables. In an embodiment, the live range of the variable having the energy saving value being greater than a threshold value can be selected and pushed into the EQueue. The live range of the variable having the energy saving value equal to or less than the threshold value can be selected and pushed into the SQueue.

Moreover, when the plurality of live ranges of the variables are classified into the EQueue and the SQueue, the live ranges of the variables in each queue can be sorted. For example, the live ranges of the variables in the EQueue are sorted with a decreasing order of the energy saving value corresponding to each of the variable. That is, the EQueue may be a priority queue based on the energy saving value. The live ranges of the variables in the EQueue may be assigned into low access energy registers. The live ranges of the variables in the SQueue are sorted with a decreasing order of the length of the live ranges of the variables. That is, the SQueue may be a priority queue based on the length of live range. Further, the live ranges of the variables in the SQueue may be assigned into general registers without low access energy registers.

In Step 106, the live ranges of the variables in the queues can be allocated to the registers. For example, the live ranges of the variables in the EQueue are allocated to the registers at first. The top node in the EQueue, which is the current live range with maximum energy saving value, is allocated into the low access energy register first, and the rest of the live ranges of the variables in the EQueue are allocated into the low access energy registers sequentially. Once the EQueue is empty, the live ranges of the variables in the SQueue are allocated into the general registers by the compiler. In other words, the live ranges of the variables in the EQueue can be allocated to the registers first, and further, the live ranges of the variables in the SQueue can be allocated to the rest of registers. Besides, when a compiler fails to assign any live ranges of the variables in the EQueue or the SQueue to the registers, go to Step 108. That is, if there is an insufficient amount of low access energy registers or general registers for allocating the live ranges of the variables in the EQueue or SQueue, the compiler further proceeds to Step 108.

In Step 108, the live ranges of the variables which have been already assigned into the registers and are popped from the EQueue may be evicted. For example, when the live ranges have already been assigned into the low access energy registers and popped from the EQueue, the compiler evicts the live ranges of the variables with lower energy saving value in the low access energy registers. In detail, the compiler first compares the energy saving value of all of the live ranges of the variables that have been already assigned into the low access energy registers and popped from the EQueue, and evicts the live ranges of the variables except the live range of a variable with a maximum energy saving value according to the comparison result. That is, when the comparison result represents that a live range has the maximum energy saving value, the compiler may evict the live ranges of the variables with lower energy saving value in the low access energy registers, rather than the live range having the maximum energy saving value. Those evicted live ranges of the variables are pushed into the EQueue again and reassigned as the implementation of Step 104.

In addition, in Step 108, when the live ranges of the variables have been already assigned into the registers and are popped from the SQueue, the compiler evicts the live ranges of the variables in the SQueue with lower spill weight in the registers, where the spill weight is a weight to spill the variables into the computer memory, such as a RAM. For example, the compiler first compares the spill weight of all of the live ranges of the variables that have been already assigned into the registers and popped from the SQueue, and evicts the live ranges of the variables except the live range of a variable with a maximum spill weight according to the comparison result. When the comparison result represents that a live range has the maximum spill weight, the compiler may evict the live ranges of the variables with lower spill weight in the registers, rather than the live range having the maximum spill weight. Those evicted live ranges of the variables are pushed into the SQueue again and are assigned by using the implementation of Step 106.

In Step 108, the evicted live ranges of the variables from the EQueue and the SQueue can be pushed back into the EQueue or the SQueue for a second chance to be assigned, which is the Step 106. Otherwise, when the live ranges of the variables cannot be evicted, the compiler further proceeds to Step 110. For example, when the comparison result represents there is no live range having the maximum energy saving value or the maximum spill weight and the live ranges of the variables cannot be evicted, the compiler further proceeds to Step 110.

In Step 110, the compiler splits the live ranges of the variables if the live ranges of the variables cannot be assigned in Step 106 or evicted in Step 108. The live ranges of the variables are split into small pieces, new live ranges of the variables, and pushed back into the queues. For example, the length of all the time intervals of the variable is split into two equal pieces and pushed into the EQueue or the SQueue for reallocation. Notably, the length of the time intervals of the new live ranges of the variables is not limited thereto. The compiler could split the live ranges of the variables bases on the computer system.

Moreover, since the compiler would insert copy instructions into the new live ranges of the variables to influence the instruction order, the compiler will recalculate the energy saving value of the new live ranges of the variables, classify the new live ranges of the variables back to the queues according to the energy saving value of each of the new live ranges of the variables and assign the new live ranges of the variables in the queues into the registers. In other words, if the live ranges of the variables are split, go to Step 102 for energy saving value calculation. In addition, the new live ranges of the variables pushed into the EQueue also have the opportunity to be assigned into the low access energy registers to enlarge the total energy saving value.

Note that when the live ranges of the variables in the EQueue cannot be split, which means the live ranges of the variables have no chance to be assigned into the low access energy register and will be classified into the SQueue to have another chance to be assigned into the general register, the compiler further proceeds to Step 112.

In Step 112, when the live ranges of the variables in the queues cannot be split in Step 110, the compiler spills the live ranges of the variables into the computer memory, thus reducing the performance of program. Since a processing speed of the spilled live ranges of the variables is much slower than the variables in the registers. Moreover, extra memory load/store operations, such as, execution time, code space, and data space will cause high cost to the processor.

Figure 2:
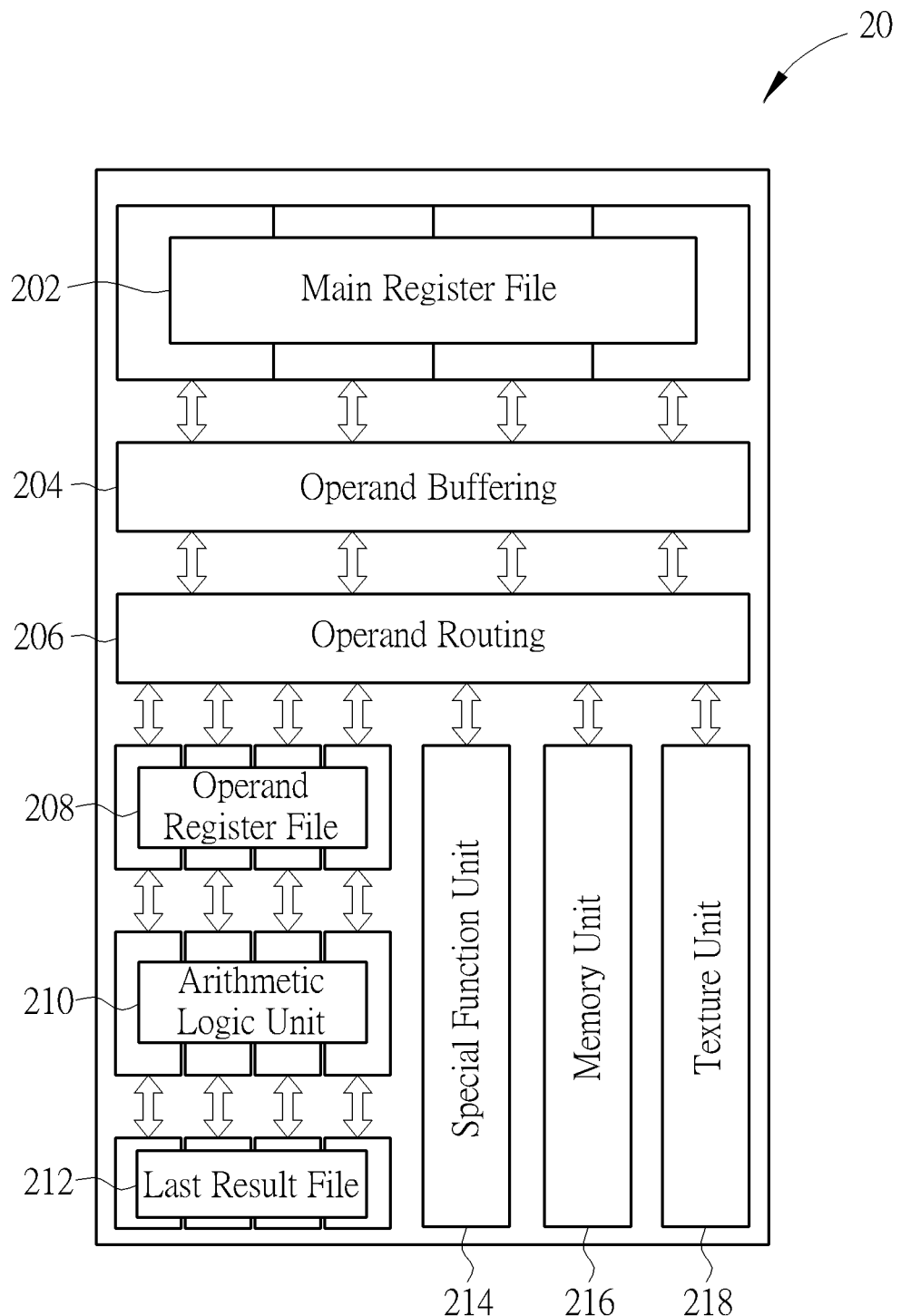
FIG. 2 is a schematic diagram of a microarchitecture of hierarchical register file according to an embodiment of the present invention.

Please refer to FIG. 2. FIG. 2 is a schematic diagram of a microarchitecture of hierarchical register file (HRF) 20 according to an embodiment of the present invention. FIG. 2 is a design of streaming multiprocessor (SM) with HRF design. In this embodiment, The HRF designs are reorganized GPU register file with a three level hierarchy, a small sized last result file (LRF), a medium sized operand register file (ORF), and a large size lower-level main register file (MRF). The LRF is a lowest access energy register file appropriately allocated to the produced value consumed in a next instruction, and the ORF is allocated for a value frequent or oncoming read. MRF is allocated for the value without the benefit or enough space to place on LRF and ORF. For example, during the assignment of Step 106, the live ranges of the variables in the EQueue can be allocated to the LRF at first.

Figure 3:
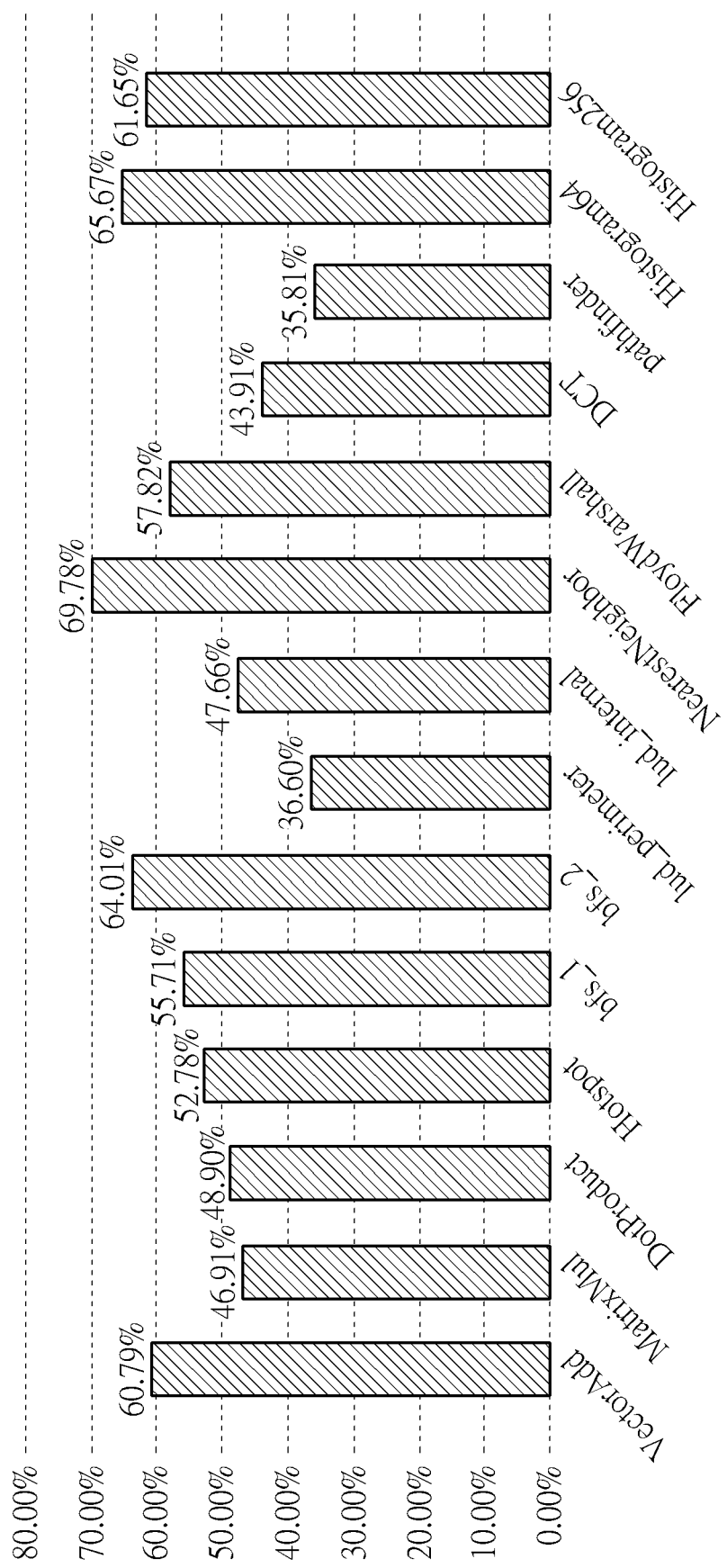
FIG. 3 is a schematic diagram of the energy saving percentage of register file when the register allocation process shown in FIG. 1 is adopted.
Figure 4:
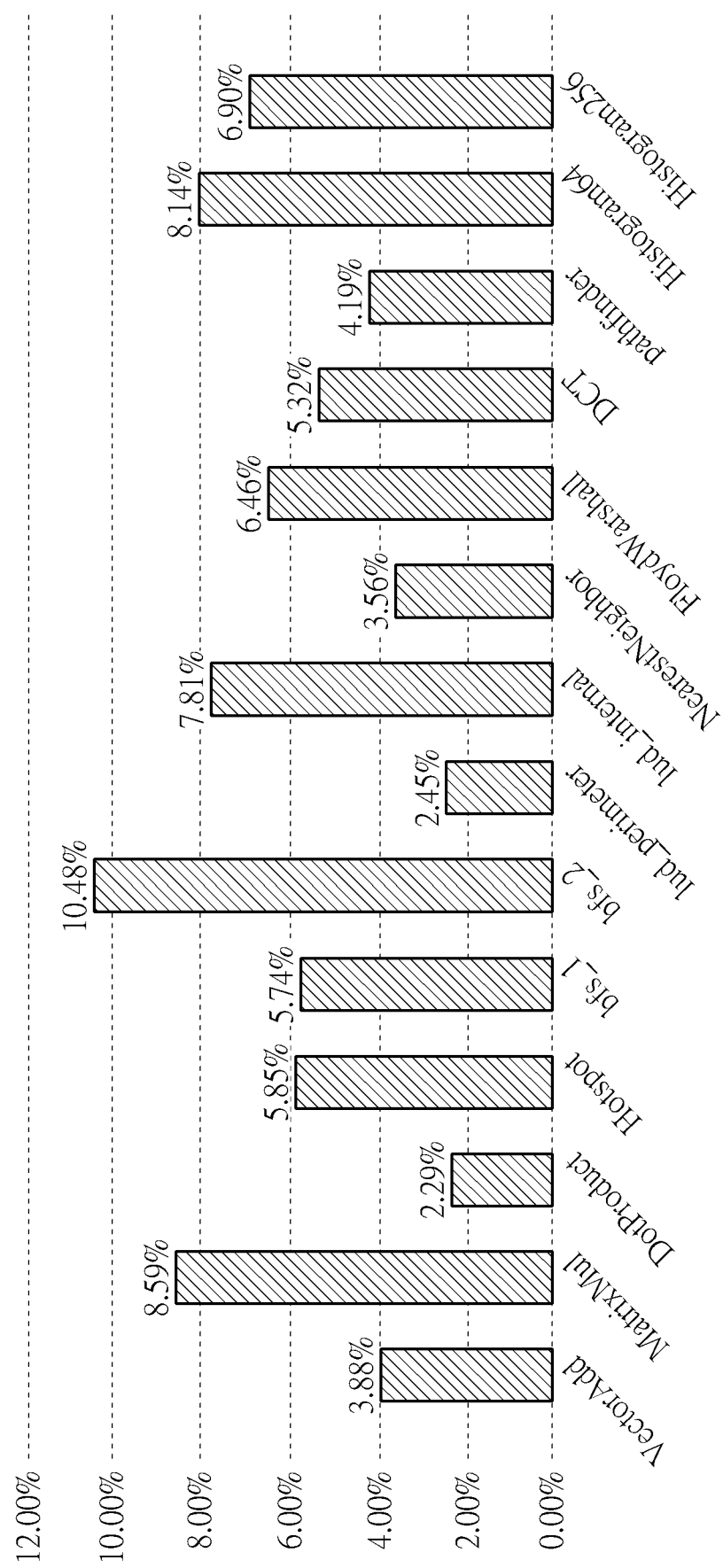
FIG. 4 is a schematic diagram of a total energy saving ratio of GPU when the register allocation process shown in FIG. 1 is adopted.

FIG. 3 and FIG. 4 are schematic diagrams of experiment result of register allocation process 10 operated in the microarchitecture of hierarchical register file. FIG. 3 is a schematic diagram of the energy saving percentage of register file when the register allocation process 10 is adopted, and FIG. 4 is a schematic diagram of a total energy saving ratio of GPU when the register allocation process 10 is adopted. GPGPU-Sim is utilized as simulator to obtain register access counts and register power consumptions. By using the register allocation process 10 of the present invention, the energy consumption of register files can be reduced by approximately 53.43% and the total energy consumption of GPU can be reduced by approximately 5.83% based on a set of benchmarks from NVIDIA GPU Computing SDK, AMD APP SDK, and Rodinia.

Figure 5:
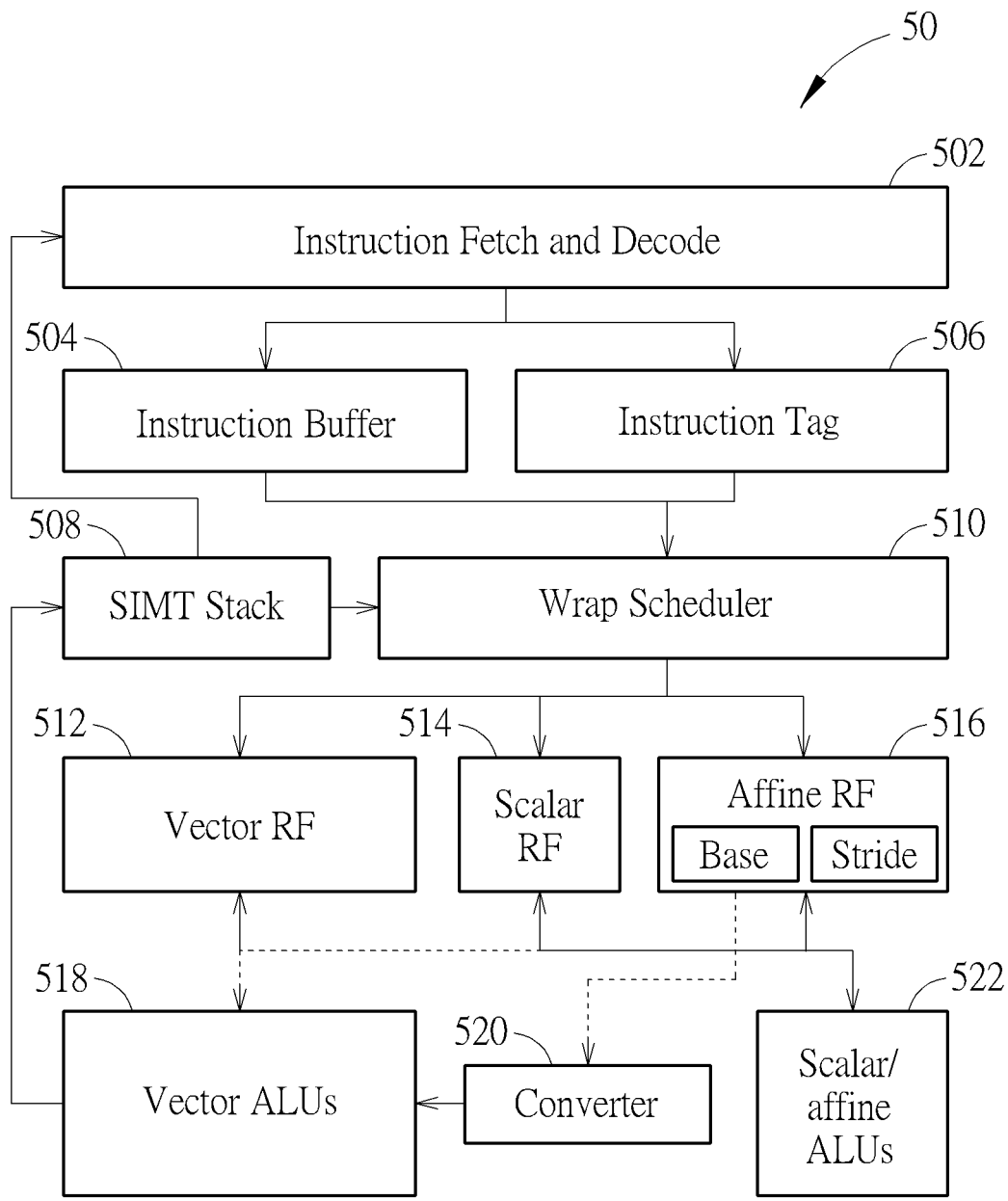
FIG. 5 is a schematic diagram of a GPU register architecture according to an embodiment of the present invention.
Figure 6:
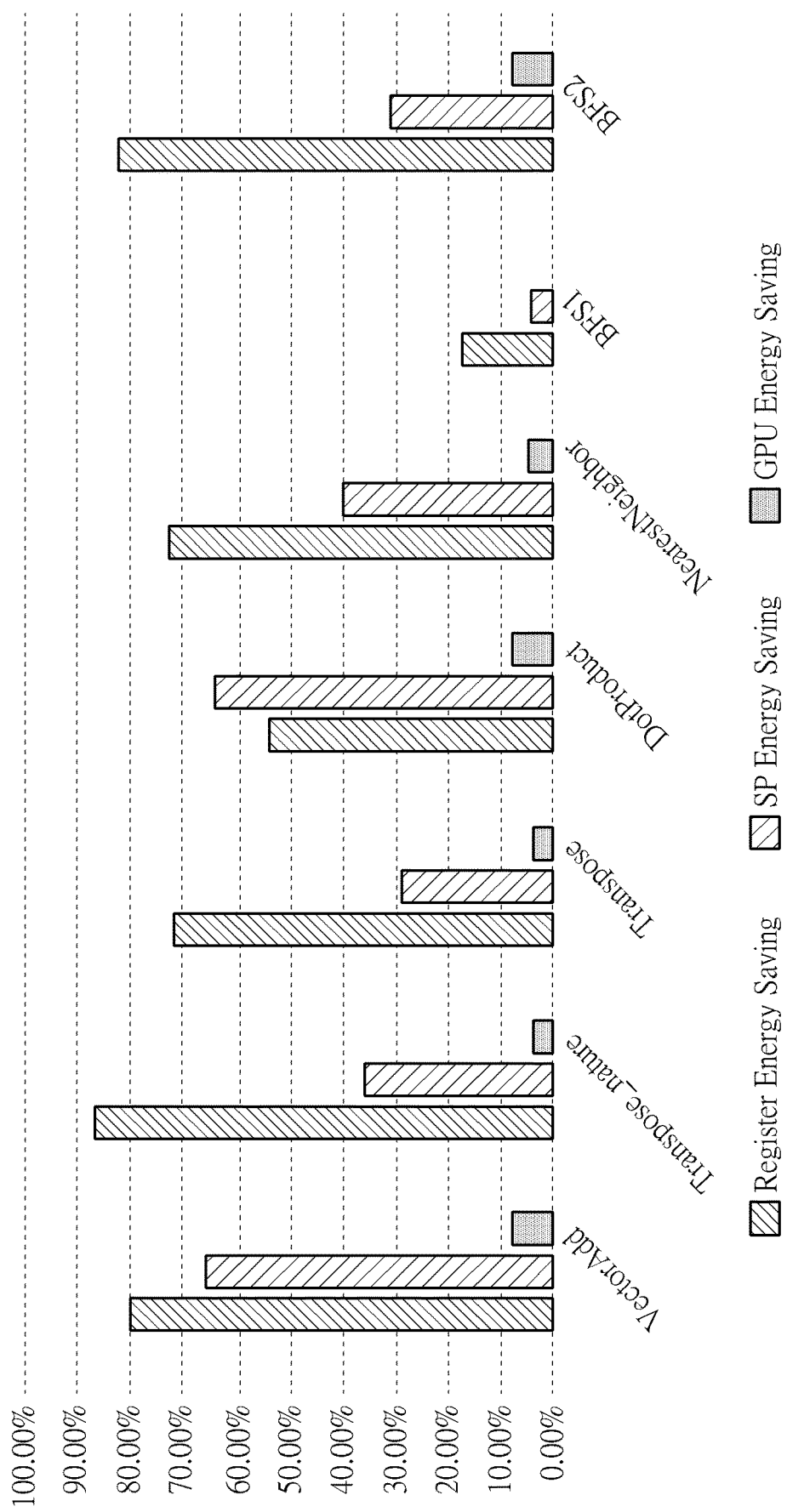
FIG. 6 is a schematic diagram of the energy saving of affine register file on GPU when the register allocation process shown in FIG. 1 is adopted.

Please refer to FIG. 5 and FIG. 6. FIG. 5 is a schematic diagram of a GPU register architecture 30 according to an embodiment of the present invention. FIG. 6 is a schematic diagram showing the energy saving of affine register file on GPU when the register allocation process 10 is adopted. Scalar register file (SRF) and affine register file (ARF) are used to store a scalar value of uniform vector and an affine value of an affine vector. The ARF use base and stride registers to represent the affine vector. The affine register file of GPUs can eliminate these redundant computations and vector register access to reduce power consumption. As shown in FIG. 6, by using the register allocation process 10, the energy consumption of register can be reduced by approximately 66.84%, the energy consumption of ALUs can be reduced by approximately 38.67% and the total energy consumption of GPU can be reduced by approximately 4.78%, thus efficiently reducing the energy consumption.

In summary, the register allocation method of the present invention reorganizes the registers into the low access energy registers and the general registers for allocation, and thereby reducing the power consumption of hardware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of allocating registers, comprising:
    for each of a plurality of live ranges of variables, calculating an energy saving value of each of the plurality of live ranges of the variables;
    classifying the plurality of live ranges of the variables into a plurality of queues according to the energy saving values of the plurality of live ranges of the variables; and
    assigning the plurality of live ranges of the variables in the plurality of queues into a plurality of registers;
    wherein the classifying the plurality of live ranges of the variables into the plurality of queues according to the energy saving values of the plurality of live ranges of the variables comprises:
        pushing the live range of the variable having the energy saving value being greater than a threshold value into a first queue of the plurality of queues; and
        pushing the live range of the variable having the energy saving value being equal to or less than the threshold value into a second queue of the plurality of queues;
    wherein the calculating the energy saving value of each of the plurality of live ranges of the variables comprises calculating the energy saving value of the each of the plurality of live ranges of the variables according to at least one of read/write access energy associated with the plurality of registers, read/write access counts associated with the plurality of registers and a length of the each of the plurality of live ranges of the variables;

wherein the plurality of live ranges of the variables in the first queue is sorted in a decreasing order of the energy saving values, and the plurality of live ranges of the variables in the second queue is sorted in the decreasing order of the lengths of the live ranges of the variables; and wherein the assigning the plurality of live ranges of the variables in the plurality of queues into a plurality of registers comprises:
assigning the live ranges of the variables in the first queue into the plurality of registers and assigning the live ranges of the variables in the second queue into the plurality of the registers when the first queue is empty.

2. The method of claim 1, further comprising:
evicting the plurality of live ranges of the variables with lower energy saving value from the first queue, which are already assigned into the plurality of registers.

3. The method of claim 2, wherein the evicting the plurality of live range variables with lower energy saving value from the first queue comprises:
comparing the energy saving values of the live ranges of the variables which are already assigned from the first queue to the plurality of registers; and
evicting the live ranges of the variables except one live range of the variable with a maximum energy saving value.

4. The method of claim 1, further comprising:
splitting one of the plurality of live ranges of the variables.

5. The method of claim 4, wherein the splitting one of the plurality of live ranges of the variables comprises:
calculating the energy saving value of the plurality of live ranges of the variables;
classifying the plurality of live ranges of the variables into the plurality of queues according to the energy saving values of the plurality of live ranges of the variables; and
assigning the plurality of live ranges of the variables in the plurality of queues into the plurality of registers.

6. The method of claim 1, further comprising:
spilling the plurality of live ranges of the variables into a computer memory.

7. A computer system of allocating registers for hardware, comprising:
a hardware processor for allocating registers; and
a memory device coupled to the hardware processor, for storing a program code instructing the hardware processor to perform a process, wherein the process comprises:
for each of a plurality of live ranges of variables, calculating an energy saving value of each of the plurality of live ranges of the variables;
classifying the plurality of live ranges of the variables into a plurality of queues according to the energy saving values of the plurality of live ranges of the variables; and
assigning the plurality of live ranges of the variables in the plurality of queues into a plurality of registers;

wherein the classifying the plurality of live ranges of the variables into the plurality of queues according to the energy saving values of the plurality of live ranges of the variables comprises:
pushing the live range of the variable having the energy saving value being greater than a threshold value into a first queue of the plurality of queues; and
pushing the live range of the variable having the energy saving value being equal to or less than the threshold value into a second queue of the plurality of queues;

wherein the calculating the energy saving value of each of the plurality of live ranges of the variables comprises calculating the energy saving value of the each of the plurality of live ranges of the variables according to at least one of read/write access energy associated with the plurality of registers, read/write access counts associated with the plurality of registers and a length of the each of the plurality of live ranges of the variables;

wherein the plurality of live ranges of the variables in the first queue is sorted in a decreasing order of the energy saving values, and the plurality of live ranges of the variables in the second queue is sorted in the decreasing order of the lengths of the live ranges of the variables; and wherein the assigning the plurality of live ranges of the variables in the plurality of queues into a plurality of registers comprises:
assigning the live ranges of the variables in the first queue into the plurality of registers and assigning the live ranges of the variables in the second queue into the plurality of the registers when the first queue is empty.

8. The computer system of claim 7, further comprising:
evicting the plurality of live ranges of the variables with lower energy saving value from the first queue, which are already assigned into the plurality of registers.

9. The computer system of claim 8, wherein the evicting the plurality of live range variables with lower energy saving value from the first queue, which are already assigned into the plurality of registers comprises:
comparing the energy saving value of the live ranges of the variables which are already assigned from the first queue to the plurality of registers; and
evicting the live ranges of the variables except one live range of the variables with a maximum energy saving value.

10. The computer system of claim 7, further comprising:
splitting one of the plurality of live ranges of the variables.

11. The computer system of claim 10, wherein the splitting one of the plurality of live ranges of the variables comprises:
calculating the energy saving value of the plurality of live ranges of the variables;
classifying the plurality of live ranges of the variables into the plurality of queues according to the energy saving values of the plurality of live ranges of the variables; and
assigning the plurality of live ranges of the variables in the plurality of queues into the plurality of registers.

12. The computer system of claim 7, further comprising:
spilling the plurality of live ranges of the variables into a computer memory.

* * * * *